US009118669B2

(12) United States Patent
Moganti et al.

(10) Patent No.: US 9,118,669 B2
(45) Date of Patent: Aug. 25, 2015

(54) METHOD AND APPARATUS FOR VOICE SIGNATURE AUTHENTICATION

(75) Inventors: Madhav Moganti, Piscataway, NJ (US); Anish Sankalia, Lawrenceville, GA (US)

(73) Assignee: Alcatel Lucent, Boulogne-Billancourt (FR)

( * ) Notice: Subject to any disclaimer, the term of this patent is extended or adjusted under 35 U.S.C. 154(b) by 287 days.

(21) Appl. No.: 12/894,198

(22) Filed: Sep. 30, 2010

(65) Prior Publication Data

US 2012/0084078 A1 Apr. 5, 2012

(51) Int. Cl.
*G10L 17/00* (2013.01)
*H04L 29/06* (2006.01)
*G06F 21/32* (2013.01)

(52) U.S. Cl.
CPC ............ *H04L 63/0861* (2013.01); *G06F 21/32* (2013.01); *G10L 17/00* (2013.01)

(58) Field of Classification Search
CPC .......... G06F 21/32; G06F 21/30; G06F 21/31
See application file for complete search history.

(56) References Cited

U.S. PATENT DOCUMENTS

| 5,504,805 | A | | 4/1996 | Lee |
|---|---|---|---|---|
| 5,509,104 | A | | 4/1996 | Lee et al. |
| 5,537,102 | A | * | 7/1996 | Pinnow .......................... 340/5.8 |
| 5,539,860 | A | | 7/1996 | DeSimone et al. |
| 5,539,861 | A | | 7/1996 | DeSimone |
| 5,559,926 | A | | 9/1996 | DeSimone |
| 5,566,272 | A | | 10/1996 | Brems et al. |
| 5,590,242 | A | | 12/1996 | Juang et al. |
| 5,613,037 | A | | 3/1997 | Sukkar |
| 5,623,539 | A | | 4/1997 | Bassenyemukasa et al. |
| 5,623,578 | A | | 4/1997 | Mikkilineni |
| 5,625,747 | A | | 4/1997 | Goldberg et al. |
| 5,644,648 | A | | 7/1997 | Bose et al. |
| 5,649,057 | A | | 7/1997 | Lee et al. |
| 5,659,665 | A | | 8/1997 | Whelpley, Jr. |
| 5,675,704 | A | | 10/1997 | Juang et al. |
| 5,675,706 | A | | 10/1997 | Lee et al. |
| 5,687,287 | A | | 11/1997 | Gandhi et al. |
| 5,710,864 | A | | 1/1998 | Juang et al. |
| 5,717,826 | A | | 2/1998 | Setlur et al. |

(Continued)

FOREIGN PATENT DOCUMENTS

| WO | 2006/015074 A2 | 2/2006 |
|---|---|---|
| WO | 2006/128171 A2 | 11/2006 |

(Continued)

OTHER PUBLICATIONS

Authenware Corporation, "AuthenWare Second-Factor Authentication", Datasheet, available online at www.authenware.com, 4 pages, Miami, Florida.

(Continued)

*Primary Examiner* — Jakieda Jackson
(74) *Attorney, Agent, or Firm* — C. Bilicska

(57) ABSTRACT

A scalable voice signature authentication capability is provided herein. The scalable voice signature authentication capability enables authentication of varied services such as speaker identification (e.g. private banking and access to healthcare account records), voice signature as a password (e.g. secure access for remote services and document retrieval) and the Internet and its various services (e.g., online shopping), and the like.

20 Claims, 6 Drawing Sheets

(56) References Cited

U.S. PATENT DOCUMENTS

| | | | |
|---|---|---|---|
| 5,724,481 | A | 3/1998 | Garberg et al. |
| 5,727,124 | A | 3/1998 | Lee et al. |
| 5,737,489 | A | 4/1998 | Chou et al. |
| 5,737,723 | A | 4/1998 | Riley et al. |
| 5,737,724 | A | 4/1998 | Atal et al. |
| 5,778,336 | A | 7/1998 | Chou et al. |
| 5,778,341 | A | 7/1998 | Zeljkovic |
| 5,781,887 | A | 7/1998 | Juang |
| 5,805,745 | A | 9/1998 | Graf |
| 5,812,972 | A | 9/1998 | Juang et al. |
| 5,870,706 | A | 2/1999 | Alshawi |
| 5,930,751 | A | 7/1999 | Cohrs et al. |
| 5,956,675 | A | 9/1999 | Setlur et al. |
| 6,006,181 | A | 12/1999 | Buhrke et al. |
| 6,009,390 | A | 12/1999 | Gupta et al. |
| 6,101,242 | A * | 8/2000 | McAllister et al. ........ 379/88.02 |
| 6,157,707 | A | 12/2000 | Baulier et al. |
| 6,437,696 | B1 * | 8/2002 | Lemelson et al. ......... 340/573.4 |
| 6,804,647 | B1 | 10/2004 | Heck et al. |
| 7,278,028 | B1 * | 10/2007 | Hingoranee .................. 713/186 |
| 7,698,566 | B1 * | 4/2010 | Stone .......................... 713/186 |
| 7,860,222 | B1 * | 12/2010 | Sidler et al. ................ 379/32.01 |
| 8,160,877 | B1 * | 4/2012 | Nucci et al. .................. 704/246 |
| 2004/0059590 | A1 * | 3/2004 | Mercredi et al. .................. 705/1 |
| 2004/0236694 | A1 * | 11/2004 | Tattan et al. .................... 705/50 |
| 2005/0084139 | A1 * | 4/2005 | Kyle ............................ 382/115 |
| 2005/0285747 | A1 * | 12/2005 | Kozlay ....................... 340/573.4 |
| 2006/0041507 | A1 | 2/2006 | Novack et al. |
| 2006/0222211 | A1 * | 10/2006 | Olivo et al. .................... 382/115 |
| 2007/0201683 | A1 * | 8/2007 | Saiin et al. .................... 379/360 |
| 2007/0219801 | A1 * | 9/2007 | Sundaram et al. ............ 704/270 |
| 2007/0260888 | A1 * | 11/2007 | Giobbi et al. ................. 713/186 |
| 2008/0215323 | A1 * | 9/2008 | Shaffer et al. ................ 704/246 |
| 2008/0244277 | A1 | 10/2008 | Orsini et al. |
| 2009/0187405 | A1 * | 7/2009 | Bhogal et al. ................. 704/246 |
| 2009/0189739 | A1 * | 7/2009 | Wang ........................... 340/10.1 |
| 2010/0179887 | A1 * | 7/2010 | Cacheria et al. ................. 705/27 |
| 2010/0228656 | A1 * | 9/2010 | Wasserblat et al. ............. 705/35 |
| 2011/0082874 | A1 * | 4/2011 | Gainsboro et al. ............ 707/769 |

FOREIGN PATENT DOCUMENTS

| | | |
|---|---|---|
| WO | 2008/047339 A2 | 4/2008 |
| WO | PCT/US2011/052705 | 12/2011 |

OTHER PUBLICATIONS

Kounoudes, A.; Kekatos, V.; Mavromoustakos, S., "Voice Biometric Authentication for Enhancing Internet Service Security", Information and Communication Technologies, 2006. ICTTA '06. 2nd Volume: 1 Digital Object Identifier: 10.1109/ICTTA.2006.1684514 Publication Year: 2006, pp: 1020-1025.

* cited by examiner

*FIG. 4*

```
<?xml version="1.0" encoding="ISO-8859-1"
<voice signature authentication directive>
    <score>80</score>                              410
    <identity information>
        <match>Yes</match>                         422
        <name>Jane Doe</name>                      424
        <phone>5551233</phone>
        <weight>20%</weight>                       426
    </identity information>
    <voice biometric>
        <match>Yes</match>
        <authNum>5555551233</authNum>              434
        <likeness>90%</likeness>                   436
        <weight>40%</weight>
    </voice biometric>
    <algorithm>
        <rule>Determine_Location_of_POS_vs_EUD</rule>   446
        <weight>40%</weight>
    </algorithm>
</voice signature authentication directive>
                                                   400
```

IDENTITY INFORMATION SECTION 420

VOICE BIOMETRIC SECTION 430

ALGORITHM SECTION 440

METHOD AND APPARATUS FOR VOICE SIGNATURE AUTHENTICATION

FIELD OF THE INVENTION

The invention relates generally to voice authentication and, more specifically but not exclusively, to providing voice signature authentication of services.

BACKGROUND

Many different types of authentication systems exist today, such as fraud detection systems used in internet commerce and voice authentication used to process enrollment, verification and voice sign transactions and image recognition systems. However, while variations of voice authentication are available, the solutions do not leverage the core communication content available to communication providers nor do they leverage a meta voice signature that includes both voice biometric information and identity tracking intelligence information.

SUMMARY

Various deficiencies in the prior art are addressed by embodiments for providing scalable voice signature authentication solutions. A scalable voice signature authentication capability is provided herein. The scalable voice signature authentication capability enables authentication of varied services such as speaker identification (e.g. private banking and access to healthcare account records), voice signature as a password (e.g. secure access for remote services, mobile wallet applications and document retrieval) and the Internet and its various services (e.g., online shopping), and the like.

BRIEF DESCRIPTION OF THE DRAWINGS

The teachings herein can be readily understood by considering the following detailed description in conjunction with the accompanying drawings, in which:

FIG. 4 depicts one embodiment for providing a voice signature authentication directive;

To facilitate understanding, identical reference numerals have been used, where possible, to designate identical elements that are common to the figures.

DETAILED DESCRIPTION OF THE INVENTION

A scalable voice signature authentication capability is depicted and described herein. The scalable voice signature authentication capability enables authentication of varied services such as speaker identification (e.g. private banking and access to healthcare account records), voice signature as a password (e.g. secure access for remote services and document retrieval) and the Internet and its various services (e.g., online shopping), and the like.

In one embodiment, the scalable voice signature authentication capability includes one or more interface channels to one or more communication providers, referred to herein as a communication interface channel. The communication interface channel is used to enable interaction with communication providers to collect communication content such as voice biometric and usage information from voice communication sources.

In one embodiment, the scalable voice signature authentication capability includes maintaining a voice signature database that associates voice biometric information with identity tracking intelligence information.

In one embodiment, the scalable voice signature authentication capability includes a voice signature server that is configured to support one or more communication interface channels and one or more application interface channels to one or more service providers, referred to herein as an application interface channel. The application interface channel is used to enable interaction with service providers to receive requests for voice signature authentication, referred to herein as voice signature authentication directives, and to provide the service provider with voice signature authentication responses. The application interface channel may also enable feedback to be provided from the service provider such as whether an authentication request was subsequently found to be valid or invalid, user use information or any other information suitable for use within the voice signature server. The voice signature server may also include a voice signature database to associate voice biometric information with identity tracking intelligence information. Finally, the voice signature server may also include a User Interface Channel to enable users to monitor and manage their stored meta voice signature information.

Figure 1:
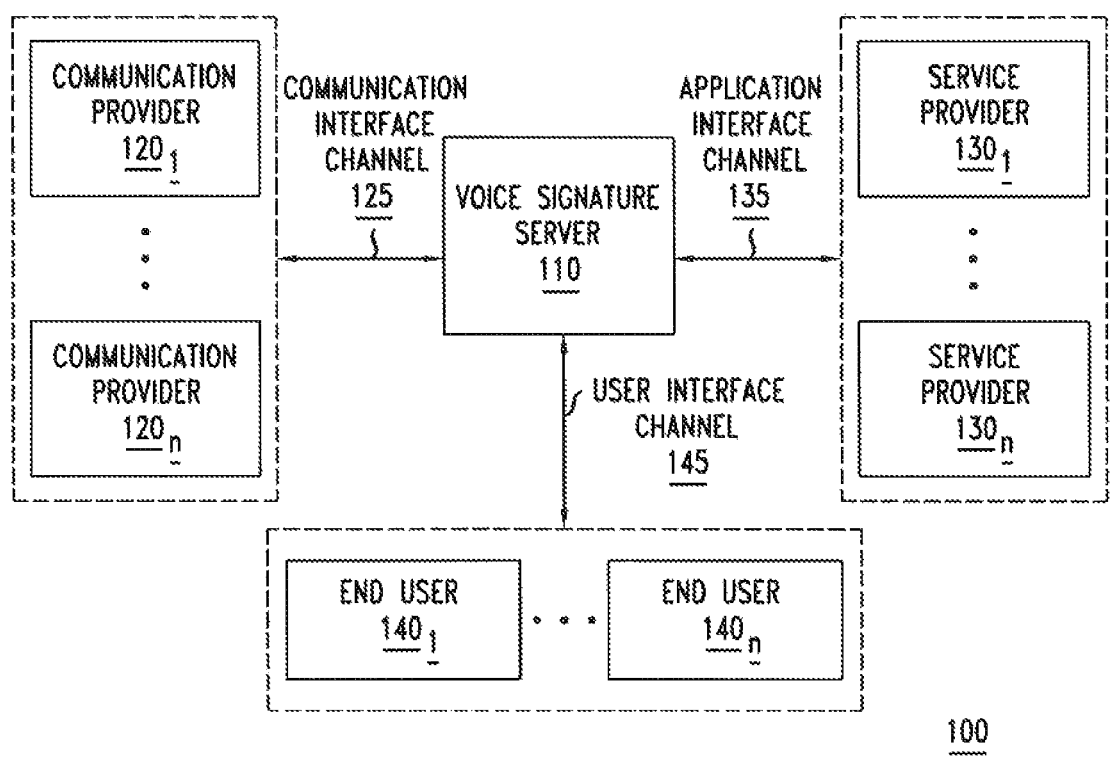
FIG. 1 depicts a high-level block diagram of an exemplary voice signature system.

FIG. 1 depicts a high-level block diagram of an exemplary voice signature system.

The voice signature system 100 includes a voice signature server (VSS) 110, one or more Communication Providers 120$_1$-120$_N$ (collectively, CPs 120), one or more service providers 130$_1$-130$_N$ (collectively, SPs 130), and one or more end users 140$_1$-140$_N$ (collectively, EUs 140).

The VSS 110 is configured for supporting a communication interface channel (illustratively, communication interface channel (CIC) 125 from CSs 120), an application interface channel (illustratively, application interface channel (AIC) 135 from SPs 130) and a user interface channel (illustratively, user interface channel (UIC) 145 supporting interaction with EUs 140).

Although depicted and described as supporting single communication channels (i.e. CIC 125, AIC 135 and UIC 145), VSS 110 is adapted for supporting any suitable number of channels supporting any suitable number(s) of sessions (e.g., any suitable number of IP flows), which may be directed between VSS 110 130 and/or any other suitable source of communications (e.g. CPs 120, SPs 130 and EUs 140).

Moreover, communication channels (i.e. CIC 125, AIC 135 and UIC 145) may support any suitable type(s) of communication paths and communication protocols. For example, communication channels (i.e. CIC 125, AIC 135 and UIC 145) may support: wireless communications (e.g., GSM and COMA); wireline communications; packet network communications (e.g., IP); VoIP communications (E.g., SIP); broadband communications (e.g., DSL); and the like, as well as various combinations thereof.

Although primarily depicted and described herein as having bi-directional communication capability, it may be appreciated that in other embodiments communication channels (i.e. CIC 125, AIC 135 and UIC 145) may simply be a transmitter configured for transmitting feedback information or a receiver configured for receiving information.

CPs 120 may include any communication sources, such as landline, cellular, and VoIP service providers, and the like.

The VSS 110 receives communication content from CPs 120 via CIC 125. As described herein, the communication content VSS 110 receives may include voice biometric information, digital or analog voice samples, voice channel properties, call information, authentication information, usage patterns, call maps, session control, calling patterns, identifiers, device information, user content, context information, personal data or any other information suitable for use in creating a meta voice signature or for use within the voice signature server.

The SPs 130 may include any service provider requesting voice signature authentication, such as internet service providers, stores, financial institutions, health care related service providers, enterprise applications, government agencies, and the like.

The VSS 110 receives voice signature authentication directives, may receive feedback from SPs 130 and provides responses to SPs 130 via AIC 135. As described herein, voice authentication requests may include voice authentication directives to enable customized use of meta voice signature information in the authentication process. As described herein, the content VSS 110 might receive may include any information suitable for use in creating a meta voice signature including feedback such as: whether an authentication request was subsequently found to be valid or invalid; user use information or any other information suitable for use within the voice signature server.

In one embodiment, for example, CIC 125 and AIC 135 are IP-based communication channels, e.g., supporting an IP-based uplink and an IP-based downlink. It may be appreciated that any other suitable communications protocols may be used. Although depicted and described herein as being bi-directional, it may be appreciated that in other embodiments, the CIC 125 and/or AIC 135 may be unidirectional, e.g. implemented as either an uplink or downlink communication channel.

The EUs 140 may include any entity using a meta voice signature, such as individual users, organizations, and the like.

The VSS 110 receives end user requests and provides responses to EUs 140 via UIC 145. As described herein, end user requests may include end user access to monitor or manage their critical data, to provide training of the meta voice signature or any other information suitable for use within the voice signature server.

In one embodiment, for example, UIC 145 is a web-based communication channel, e.g., supporting a web-based channel. In another embodiment, UIC 145 may be a wireless, landline or VoIP based communication channel, e.g. for supporting a telephony-based channel. It may be appreciated that any other suitable communications protocols may be used. Although depicted and described herein as being bi-directional, it may be appreciated that in other embodiments, the UIC 145 may be unidirectional, e.g. implemented as either an uplink or downlink communication channel.

Figure 2:
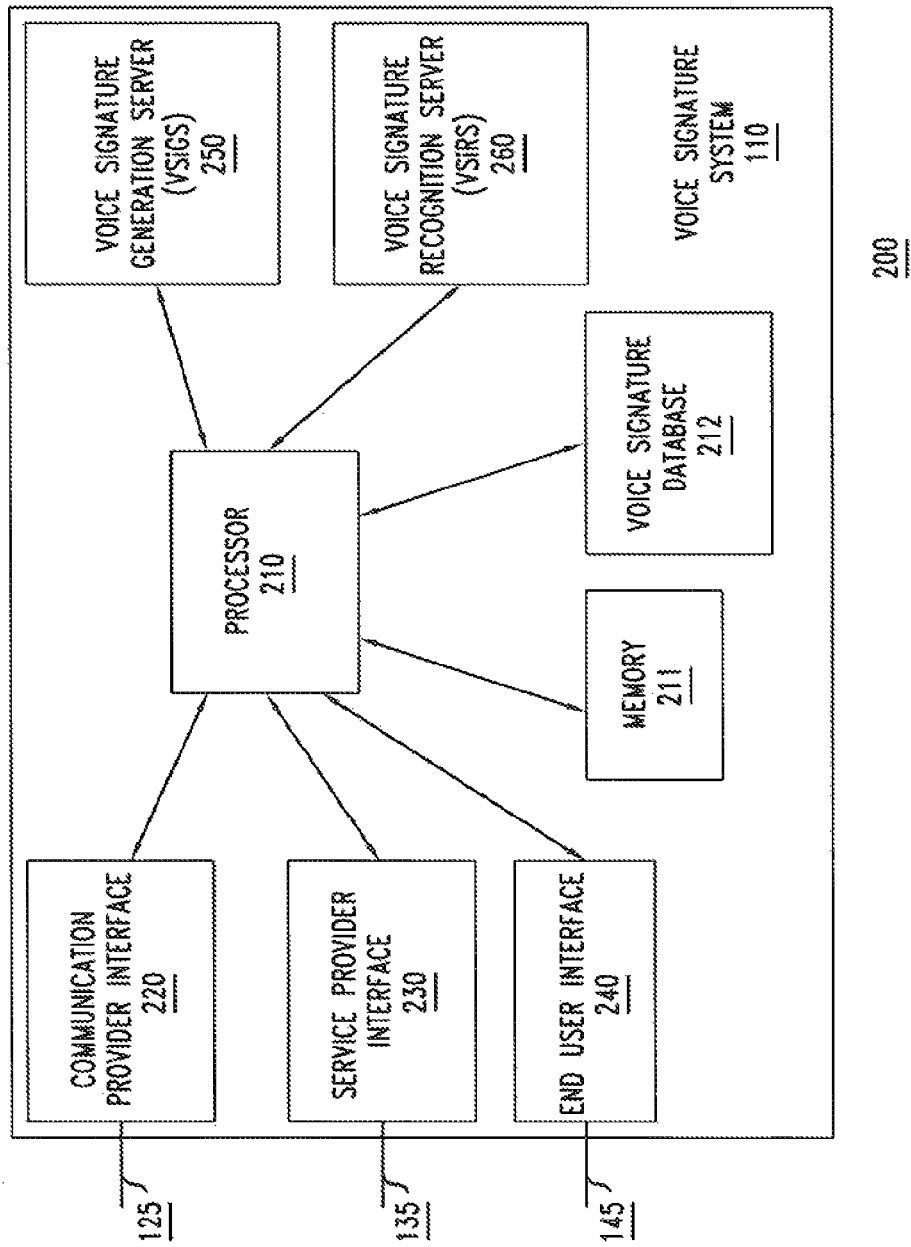
FIG. 2 depicts a block diagram of one embodiment of the exemplary voice signature server of FIG. 1.

FIG. 2 depicts a block diagram of one embodiment of the exemplary voice signature server of FIG. 1.

The voice signature server (VSS) 110 includes a processor 210, memory 211, a voice signature database (VSDB) 212 a communication provider interface (CPI) 220, a service provider interface (SPI) 230, an end user interface (EUI) 240, a voice signature generation server (VSiGS) 250, and a voice signature recognition server (VSiRS) 260 (collectively, elements of VSS 110). It may be appreciated that although depicted in FIG. 2 as one system, the elements of VSS 110 are not required to be co-located (e.g. VSDB 212 may be located remotely). Moreover, it may be appreciated that the communication between elements of VSS 110 do not need to be direct (e.g. buffers, switches, and other systems may lie between elements of VSS 110). Furthermore, it may be appreciated that though depicted in FIG. 2 as singular elements, each of the elements of VSS 110 may contain a plurality of such like elements cooperating to perform the functions described herein. Additionally, it may be appreciated that the VSS 110 may be a distributed system that communicates through a communication network.

The processor 210 is configured for controlling the operation of VSS 110. The processor 210 is coupled to each of memory 211, VSDB 212, CPI 220, SPI 230, EUI 240, VSiGS 250 and VSiRS 260. Although depicted and described herein as being a single processor, it may be appreciated that in other embodiments, processor 210 may be a plurality of processors (e.g. a separate processor may be coupled to interfaces CPI 220, SPI 230, and EUI 240, a separate processor may control VSDB 212, or a separate processor may control VSiGS 250). As such, the term processor (e.g. processor 210) referred to herein is meant to encompass all suitable combinations of processor(s) as described herein.

The memory 211 is configured for storing programs, data, and like information suitable for use in providing various capabilities depicted and described herein. Processor 210 cooperates with memory 211 for providing the various capabilities depicted and described herein (e.g., executing programs and control logic, accessing data for processing, processing voice signature authentication directives received from SPs 130, collecting information to be provided by interfaces CPI 220, SPI 230, and EUI 240 and the like, as well as various combinations thereof).

VSDB 212 is configured for storing the meta voice signature information for use in providing various capabilities depicted and described herein. Processor 210 cooperates with VSDB 212 for providing the various capabilities depicted and described herein (e.g., accessing meta voice signature information for processing, processing voice signature authentication directives received from SPs 130, collecting information to be provided by interfaces CPI 220, SPI 230, and EUI 240 and the like, as well as various combinations thereof).

Although depicted and described herein with respect to embodiments in which, for example, programs and logic are stored within memory 211 and meta voice signature data is stored within VSDB 212, it may be appreciated that such information may be stored in any other suitable manner (e.g., using any suitable number of memories or databases internal to VSS 110; storing information in any suitable combination of memory(s) or database(s) (e.g. storing user preferences in either memory or the database or storing the program or logic in the database); or using any suitable number of memories or databases external to VSS 110 and accessible to VSS 110 on any suitable types and/or numbers of other network elements configured for hosting such information and making such information available to VSS 110 for use in providing various capabilities and/or processing of such information for use in providing the various capabilities as depicted and described herein). As such, the terms memory (e.g. memory 211) and database (e.g. VSDB 212) referred to herein are meant to encompass all suitable combinations of memory(s) and database(s) as described herein.

In one embodiment, processor 210, memory 211 and VSDB 212 may form a plurality of physical or virtual machines in order to partition the data. For example, virtual machines may be used to partition data from: one or more CPs 120; one or more SPs 130; entities who subscribe to a voice authentication service (e.g. corporations or the government); data sources providing sensitive information or with differing levels of access (e.g. a law enforcement agency may have access to more types and sources of information) or any other suitable grouping. It may be appreciated that partitioning the data within different physical or virtual machines may provide: strong isolation from different groups of data (e.g. for security benefits); provide flexibility in underlying database structures for different users of the data; and increased benefits in application provisioning, maintenance, high availability and disaster recovery. Furthermore, it may be appreciated that any suitable combination of elements of VSS 110 may cooperate to form a virtual machine or cooperate in any suitable way to provide the capabilities described herein.

VSiGS 250 is configured for creating meta voice signatures from the voice signature information stored in VSDB 212. Processor 210 may cooperate with VSiGS 250 for providing the various capabilities depicted and described herein (e.g., providing a meta voice signature in response to a voice signature authentication directive).

In one embodiment, each of the CPs 120 that has been registered by an end user (e.g. through EUI 240) generates communication content, as described herein, for that user. It may be appreciated that for each market segment (e.g. financial, healthcare, telecommunications, government and consumer) there may be different end user identity characteristics that have to be mined. Moreover, it may be appreciated that whenever these characteristic values change at the source CPs 120, the meta voice signature may need to be updated/retrained by VSiGS 250 and stored in VSDB 212. Furthermore, meta voice signature characteristics may be stored in a distribution which may be used to facilitate determining the likelihood of that value occurring in the real-world. It may be appreciated that the distribution for each characteristic may be updated immediately after it is used by the application.

In one embodiment, VSiRS 250 may generate/train the meta voice signature information, including voice biometric information, stored in VSDB 212. It may be appreciated that for each market segment there may be different meta voice signature characteristics collected, including biometric characteristics (e.g., voice biometrics for free speech, voice biometrics for passwords or Voice Channel Properties).

In one embodiment, VSiGS 250 may generate/train the voice biometric information stored in VSDB 212 by performing one or more of the following: (1) extracting the voice biometric information from the received communication content, processing the voice biometric information and representing the voice biometric information in a mathematical model; (2) representing the voice biometric structure history (e.g., usage and success) in a distribution which may be used to determine the likelihood of each individual voice biometric characteristic occurring in the real-world; (3) updating/retraining the reference voice biometric information for each successful and/or unsuccessful voice biometric match in real-world usage; and (4) updating the distribution for each characteristic after it is used by the application.

VSiRS 260 is configured for comparing information received in a voice signature authentication directive with the meta voice signatures from the voice signature information stored in VSDB 212 and for performing a voice recognition comparison. Processor 210 may cooperate with VSiRS 260 for providing the various capabilities depicted and described herein (e.g., providing a response to a voice signature authentication directive).

In one embodiment, VSiRS 260 may perform a voice recognition comparison by performing one or more of the following: (1) upon receipt of a voice signature authentication directive, the received voice signature authentication directive may be used to index the end user record (e.g., an individual end user or a set of end users) and retrieve the stored meta voice signature for the identified end user or end user set; (2) retrieving voice channel characteristics associated with the communication session (e.g., voice channel properties); (3) retrieving call usage information for the indentified end user, end user set or any suitable grouping (e.g., typical fraud call usage patterns or typical market call usage patterns); and (4) based on voice biometric information stored for the end user for this application in VSDB 212, one or more of the following events may be executed: (a) initiating an appropriate password request algorithm; (b) collecting an end user voice sample which may be processed to obtain the received voice biometric information; and (c) matching the received voice biometric Information against the stored voice biometric information for this user.

It may be appreciated that any suitable response may be given in response to a comparison of the received voice biometric information against the stored voice biometrics information including: (1) returning the results of the comparison; (2) using information from the user's profile, if it exists, to validate the meta voice signature if the match was not successful; (3) or returning a flag indicating the results of the comparison.

In one embodiment, SPs 130 (e.g. enterprise service providers such as: banks; corporations and government agencies) may co-locate VSDB 212 and VSiRS 260 with SPs 130 to enable authentication of their customers and/or constituents against meta voice signatures locally stored.

Although depicted and described with respect to a single module supporting CIC 125 (illustratively, CPI 220), AIC 135 (illustratively, SPI 230), and UIC 145 (illustratively, EUI 240) any suitable numbers and/or types of communication modules may be used to support channels CIC 125, AIC 135 and UIC 145. The communication modules may include one or more receivers, one or more transmitters, one or more transceivers, one or more other types of components suitable for supporting communications via channels CIC 125, AIC 135 and UIC 145, and the like, as well as various combinations thereof.

The VSS 110 receives communication content from CPs 120 via CIC 125. As described herein, the communication content VSS 110 receives may include voice biometric information, digital or analog voice samples, voice channel properties, call information, authentication information, usage patterns, call maps, session control, calling patterns, identifiers, device information, user content, context information, personal data or any other information suitable for use in creating a meta voice signature or for use within the voice signature server.

CPI 220 is configured for supporting communication with CPs 120 via CIC 125. Using communication content from existing communications infrastructures (e.g. landline, cellular or Voice over IP) to create meta voice signatures may: provide more avenues for collecting data (e.g., landline, cellular or Voice over IP); reduce costs; allow dissemination and collection of information other than key biometric data, such as, the collection of names, address, and telephone numbers; be employed in multilingual applications; and rely on a signal that is natural and unobtrusive to produce and is easily obtained with no special user equipment or training which results in the rapid deployment without addition additional training requirements. Processor 210 cooperates with CPI 220 for providing the various capabilities depicted and described herein (e.g. analyzing received voice biometric information and storing received content in VSDB 212).

In one embodiment, CPI 220 may be configured to receive encrypted information via CIC 125. Moreover, one-way encryption algorithms may be used to protect the privacy concerns of individual users. Information stored using one-way encryption algorithms will not be able to be decrypted, preserving the security of the information, but will still be able to be used for authentication within VS 110 by similarly encrypting the retrieved information to be compared. It may be appreciated that many forms of encryption exist which may be utilized.

In one embodiment, CPI 220 may be configured to receive voice biometric information via CIC 125. Voice biometric information may be created on stored voice or on the fly during a user's voice communication to preserve user privacy concerns (e.g. small portions of voice packets are kept in memory and destroyed once the voice biometrics are created). CPs 120 may communicate these voice biometrics at any suitable time (e.g. during the call, after the call, or grouped with other data summary data at a later time or upon request from VSS 110).

Moreover, CPI 220 may be configured to cooperate with processor 210 to analyze the voice biometric information received via CIC 125. For example, voice channel characteristics received from CPs 120 regarding the channel conditions when the voice biometric was created may indicate differing levels of line quality. This information may be used to manipulate the voice biometric data stored in VSDB 212 or may indicate that the data is not useful and should not be stored within VSDB 212. Additionally, the owner of a communication device (e.g. a cellular telephone, landline telephone, VoIP telephone (including VoIP softphones), computers (e.g., providing voice communication software such as currently provided by Skype, Google and Yahoo!) and the like) may allow another user access to his communication device. By comparing the received voice biometrics with the meta voice signature stored in VSDB 212, VSS 110 may determine that the received information is not indicative of the identified user and will not be stored in VSDB 212 to be used to construct the user's meta voice signature.

In one embodiment, CPI 220 may be configured to place a call to a specified address via SPs 120 and then to instruct the SPs 120 to either terminate the call to VSS 110 via CIC 125 or to provide voice biometric information based on the requested call to VSS 110 via CIC 125. Such a request may be the result of a voice signature authentication directive received via AIC 135.

SPI 230 is configured for supporting communicating with SPs 143 via AIC 135. Processor 210 cooperates with SPI 230 for providing the various capabilities depicted and described herein (e.g. analyzing received voice signature authentication directives and storing received content in VSDB 212).

In one embodiment, SPI 230 may be configured to receive encrypted voice signature authentication directives via AIC 135. It may be appreciated that many forms of encryption exist which may be utilized. Voice signature authentication directives, as depicted and described herein, may be in the form of an API customized by SPs 130 based on the particular authentication requirements of each of the individual SPs 130 (e.g., customized at a market segment or application level). It may be appreciated that by providing a generally accessible interface AIC 135 and a defined API, a scalable VSS 110 may be achieved.

EUI 240 is configured for supporting communicating with EUs 140 via UIC 145. Processor 210 cooperates with EUI 240 for providing the various capabilities depicted and described herein (e.g. user management, monitoring and editing the content stored in memory 211 and VSDB 212). It may be appreciated that by providing EUs 140 access to their critical data and monitoring capabilities, end user confidence and trust may be fostered.

In one embodiment, EUI 240 may be configured to receive encrypted requests via UIC 145. It may be appreciated that many forms of encryption and authentication methods exist which may be utilized. Moreover, it may be appreciated that to protect the privacy of the stored information, access to varying degrees of sensitive end user information may use varying degrees of encryption and authentication methods.

In one embodiment, requests received over UIC 145 may be directed to inquiring whether an entry exists for the end user in the VSDB 212 or whether the voice signature service is activated for a user account. As an example, these requests may be made from entering a key sequence such as "*AVSS" on a telephone keypad to activate voice signature service or "*DVSS" to de-activate voice signature service. For example, these commands may allow a user to opt-in or opt-out of allowing their information to be used in voice signature services enabling the user to maintain control of how their personal data is used within the system.

In one embodiment, requests received over UIC 145 may be directed to more advanced management and monitoring activities such as: monitoring the meta voice signature information stored in VSDB 212; managing the meta voice signature information stored in VSDB 212 (e.g. editing identity tracking information; or editing the voice biometric information by initiating a training sequence); managing end user configuration information (e.g., managing authentication telephone numbers/addresses used for establishing a communication session to perform a voice analysis); creating automated notifications for when any end user information is edited or accessed; deleting the end user record from the VSDB 212; activating/de-activating the information being automatically obtained from CPs 120 over CIC 125; authorizing/registering CPs 120 to deliver meta voice signature information; or activating/de-activating voice signature authentication on either all transactions, a per service provider basis, a category of service providers (e.g. online purchases, healthcare or banking), or any other suitable grouping. As an example, these requests may be made from an end user accessing a web page specified by a URL.

In one embodiment a user may associate one to many relationships between communication addresses (e.g., telephone numbers) and/or communication devices, end users and/or associated groups of users (e.g., a family, employees or members of an organization). For example, (1) one end user may be associated with one or more communication addresses/devices; (2) a communication address/device may be associated with one or more end users (e.g., a family, employees or members of an organization); or (3) one or more groups of users may be associated with one or more communication addresses/devices (e.g., the members of a company's financial group being associated with a set of telephone numbers or telephones).

It may be appreciated that although described and depicted herein as using a telephone keypad for one set of management and monitoring activities and a web interface for a second set of management and monitoring activities, any suitable interface methods (e.g., telephone keypad, web browser, custom application, mobile app or the like) may be employed by the user to interface with EUI 240 via UIC 145.

It may be appreciated that the VSS 110 may be configured to provide any other suitable monitoring and management functions to the end user via UIC 145 in conjunction with the capabilities of the VSS 110.

Figure 3:
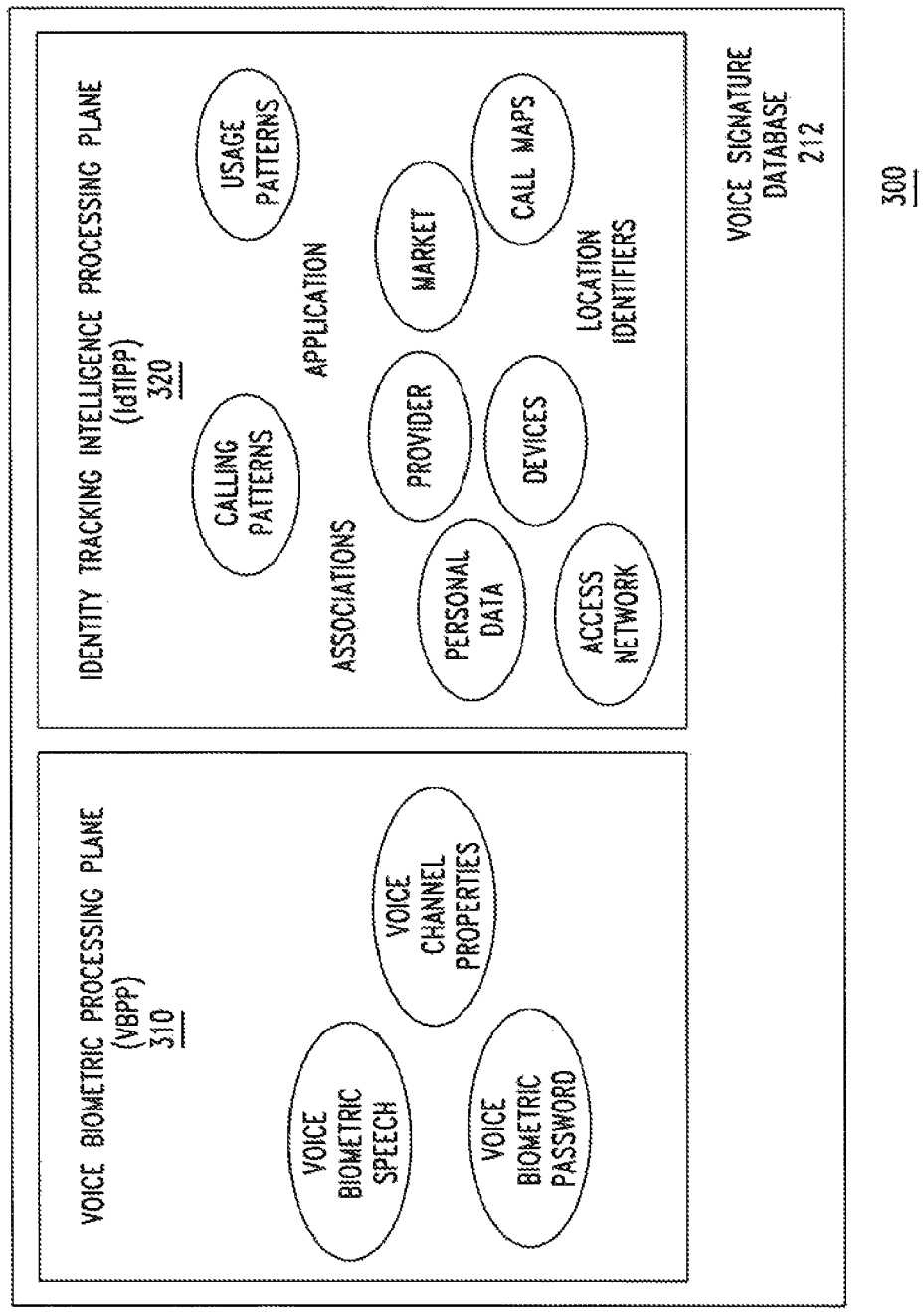
FIG. 3 depicts a block diagram of one embodiment of the exemplary voice signature database of FIG. 2.

FIG. 3 depicts a block diagram of one embodiment of the exemplary voice signature database of FIG. 2.

The voice signature database (VSDB) 212 includes a voice signature structure that include both a voice biometric processing plane (VBPP) 310 and an identity tracking intelligence processing plane (IdTIPP) 320. It may be appreciated that a meta voice signature that provides strong authentication may be created by associating the voice component information from VBPP 310 with the individual identity information from IdTIPP 320.

As depicted and described in FIG. 3, the VBPP 310 contains voice biometric information and may also contain additional information such as voice channel property information and voice biometric password information. Voice biometrics is a viable authentication method because just like a fingerprint or iris, voice is unique to the individual. Moreover, as previously noted, voice may contain advantages over other authentication methods due to its ability to partner with communication systems to deliver scalable and accurate remote authentication. Voice biometrics may include a number of measured characteristics ranging from dialect and speaking style to pitch, spectral magnitudes and format frequencies.

As depicted and described in FIG. 3, the IdTIPP 320 contains information associated with user/network information which may point to an individual's identity (or a group's identity) and may contain information such as: personal data (e.g., name, address, preferences and language); devices (e.g., SIM, SoftSIM, MAC and Serial Number); context (e.g., location/presence and roaming); user content (e.g., pictures, video, address book and calendar); relationships (e.g., banks/enterprise, school, workplace, friends and social networks); interactions (e.g., browsing history, domains, and cache information); credit (e.g., scores, demographics and average balance); identifiers (e.g., number, SIP address, email address and IP address); calling patterns; provider information (e.g. service provider, content provider, ISP, MSO, and enterprise); access (e.g., copper, FTTH/FTTC, 2G/3G/LTE and DSL/Cable); session control (e.g., SS7, SIP and MAP); call maps (e.g., place a to place b and time/frequency); network services (e.g., DHS, policy/security and management); usage patterns (e.g., bandwidth, minutes, data usage and pay plans); associations; application (e.g., application segment and usage frequency); market (e.g., market segment); payment (e.g., mobile wallet enabled and voice signature enabled); application delivery (e.g., load balancing, firewall and optimization); quality (e.g., QoS, Cos and Qoe); servers (e.g., dedicated, cloud, hosted or application environment); authentication (e.g., SSO and AAA) and performance (e.g., metrics).

In one embodiment, meta voice signatures may be created by rendering end user voice on the bearer channel of the voice network of an existing communications infrastructure creating a unique voice biometric signature and over time, and constantly updating this unique voice biometric to obtain an accurate representation of the meta voice signature of the end user.

In one embodiment, meta voice signatures from one or more communication providers or one or more communication devices may be stored separately. For example, referring to FIG. 1, VSS 110 may store the received meta voice signature information from CP 120$_1$ and CP 120$_2$ separately in VSDB 212. Subsequently retrieved meta voice signatures may then: (1) contain only the meta voice signature from one communication provider (e.g., CP 120$_1$ and CP 120$_2$) or (2) may combine the meta voice signatures from one or more communication providers (e.g., CP 120$_1$ and CP 120$_2$).

It may be appreciated that the different sources of meta voice signature information (e.g., CP 120$_1$ and CP 120$_2$) may contain different types of information. As such, the process of combining meta voice signatures from different communication providers (e.g., CP 120$_1$ and CP 120$_2$) during storage or when combining retrieved meta voice signatures (e.g., when CP 120$_1$ and CP 120$_2$ meta voice signatures are stored separately) may require VSDB 212 to compensate for the unsymmetrical information.

It may be appreciated that maintaining separate meta voice signature information from different communication providers and/or of identified types of information allows an end user the ability to manage the amount of information available to different service providers and/or applications. For example, (1) different service providers may be constrained to end user meta signature information from identified communication providers or (2) sensitive or private information (e.g., credit information or personal data) may be constrained to trusted sources (e.g., financial institutions) or government agencies (e.g., law enforcement).

Although primarily depicted and described herein with respect to a VBPP 310 and IdTIPP 320 as shown in FIG. 3, it may be appreciated that any memory structure that associates voice biometric information and identity tracking information will be suitable.

FIG. 4 depicts one embodiment for providing a voice signature authentication directive 400. As depicted in FIG. 1, the voice signature authentication directive 400 may be in the form of an API customized by SPs 130 based on the particular authentication requirements of each of the individual SPs 130 (e.g., customized at a market segment or application level). It may be appreciated that by providing a generally accessible interface AIC 135 and a defined API, a scalable VSS 110 may be achieved.

In one embodiment, the voice signature authentication directive 400 may include one or more of: fields such as score field 410 for controlling the behavior of voice signature authentication directive 400, an identity information section 420, a voice biometric section 430 and algorithm section 440. Additionally, each section, 420, 430 and 440, may also include one or more fields such as for example: an activation field 422, a parameter input field 424, or a weighting field 426. Furthermore, specialized fields may be used in some sections such as: voice biometric section 430 may include an authNum field 434 or a likeness field 436 and algorithm section 440 may include algorithm rules 446.

In one embodiment, score field 410 may be used to provide an indication of the level of trust required by SPs 130 to authenticate an end user's voice signature as a match with the meta voice signature stored in VSDB 212. It is appreciated that many suitable way of scoring results exist.

In one embodiment, results may be scored based on rule-based constructs such as: (1) if a match does not exist, fail the authentication; or (2) if a match does not exist, attempt a different matching method. Moreover, weightings may be given to individual rules and if the aggregate of the executed rules produce a result greater than score field 410, then VSS 110 may return a pass result to voice signature authentication directive 400. It may be appreciated that many other suitable ways of scoring results exist and any suitable algorithm may be used (e.g., alternative rule-based/chaining of rules methodologies and heuristic reasoning—e.g., giving scores based on ad hoc combinations of various factors).

It may be appreciated that the voice signature authentication response from VSS 110 to SPs 130 via AIC 135 in response to a voice signature authentication directive 400 is not constrained to a "pass/fail" response and may include any information suitable for use by SPs 130 (e.g., the aggregate score result may be returned, individual results may be returned, or specific information stored in VSDB 212 may be returned). Moreover, it may be appreciated that the types of information contained in the voice signature authentication response may be defined by SPs 130 within the voice signature authentication directive 400 (e.g., including a field(s) that defines the types of results expected to be included in the response).

In one embodiment, Identity Information Section 420 may include directives and parameters involving information stored within IdTIPP 320 of VSDB 212; Voice Biometric Section 430 may include directives and parameters involving information stored within VBPP 310 of VSDB 212; and algorithm section 440 may include API defined algorithms for operation on data stored within VSS 110 such as information stored within memory 211 or VSDB 212.

It may be appreciated that any suitable way of delivering the directives and parameters of voice signature authentication directive 400 may be used, for example: sections 420, 430 and 440 may co-exist in one region; sections or fields may be nested or configured in such as way as to indicate a relationship between sections or fields; treatment directives may be included in defined fields; or information on treatment of data may be pre-configured and stored in memory 211 or VSDB 212 of VSS 110.

In one embodiment, voice signature authentication directive 400 is configured to allow SPs 130 to establish relationships between sections and fields. Establishing relationships enables SPs 130 to: configure the order in which rules are executed; dynamically adjust the weight placed on each rule; dictate the logic which determines whether a rule is executed or which rule to execute based on dynamic conditions and results of other rules; and the like.

In one embodiment, activation field 422 may be defined to indicate whether the section is used in the authentication analysis. It may be appreciated that activation field 422 may also be used on a per field basis to indicate whether a particular field is used in the analysis or may contain logic (e.g., a weighting value) to indicate that the section/field is to be used in the authentication analysis if the previous results fall above or below the threshold identified in activation field 422.

In one embodiment, parameter input field 424 may be defined to indicate whether SPs 130 have collected information from the end user to be used in authentication analysis (e.g., performing a simple match of the end user's name stored in IdTIPP 320 of VSDB 212).

In one embodiment, weighting field 426 may be defined to indicate scoring treatment to be used for the section in the authentication analysis. It may be appreciated that weighting field 426 may also may also be associated on a per field basis to indicate the scoring treatment on a per field basis.

In one embodiment, voice biometric section 430 will contain the information required to establish a communication session and perform a voice analysis. Once a communication session is established, EUs 140 may be required to speak a phrase in order that the voice biometrics may be determined and subsequently matched to the voice biometrics stored in VBPP 310 of VSDB 212. Any suitable phrase may be used, for example: the end user may simply speak any phrase of sufficient length to determine voice biometric information; SPs 130 may define the pass phrase within a defined field within voice biometric section 430; EUs 140 may configure their stored information by adding a passphrase through UIC 145; or processor 210 may randomly choose commonly known personal information from within IdTIPP 320 of VSDB 212.

In one embodiment, authNum field 434 may be defined to indicate a communication number to use in collecting voice biometric information from an end user. It may be appreciated that SPs 130 may also define a field within voice signature authentication directive 400 to deliver collected voice biometric information for use in the authentication analysis. Alternatively, EUs 140 may also be permitted to configure their accounts through EUI 240 via UIC 145 to select which communication address and method would be used to establish a communication session to perform a voice analysis. This configuration may be for an application such as mobile wallets and may include a capability similar to the "Find Me" capabilities currently prevalent on many unified communication platforms.

It may be appreciated that a communication number may be used to initiate the communication required for performing a voice biometric analysis and collecting communication content. Communication may be initiated through any suitable interface such as: over CIC 125, over AIC 135 or any other communications links accessible to VSS 110 and suitable for the purpose of establishing the communication session. Moreover, it may be appreciated that the communication session may be terminated by VSS 110 in order that VS 110 may determine the voice biometrics of the call, or that the voice biometrics may be returned by the contacted communication gateway (e.g., CPs 120 or SPs 230) (i.e., perform a voice analysis).

It may be appreciated that though authNum field 434 is depicted and described as a telephone number, any suitable identifier suitable for establishing a communication session may be used (e.g., a SIP identifier or a SPs 130 defined address).

In one embodiment, likeness field 436 may be defined to indicate a scoring buffer to be used for the voice biometric authentication. It may be appreciated that voice biometrics will not always produce exact matches of the voice biometrics stored in VBPP 310 of VSDB 212 and thus, allowing a buffer may increase the effectiveness of the analysis.

In one embodiment, algorithm section 440 may define algorithms for operation on data stored within VSS 110 such as information stored within memory 211 or VSDB 212. For example, algorithms may include one or more of the following: (1) requesting location information of the end user's communication device (e.g. cellular telephone) from CPs 120 via CIC 125, requesting location information of SPs 130 (e.g. POS device) via AIC 135 and authenticating that the devices are substantially co-located; (2) matching a transaction authorized/delegated user versus the end user; (3) retrieving IdTIPP 320 identity information (or other suitable information stored in memory 211 or VSDB 212) to return to SPs 130 within the voice signature authentication response; or (4) requesting fraud scoring from an external source (e.g., weighting the call usage of the end user against characteristics found in a typical fraud transaction).

Although primarily depicted and described with respect to XML and the fields shown in FIG. 4, it may be appreciated that any suitable formatting may be used to define the structure of the voice signature authentication directive and that any suitable field or algorithm may be used within the voice signature authentication directive. Moreover, it may be appreciated that if the end user is in communication with the same apparatus that is generating the voice authentication directive, the voice authentication directive may be the local retrieval from memory of suitable information to be used in the meta voice signature authentication.

Figure 5:
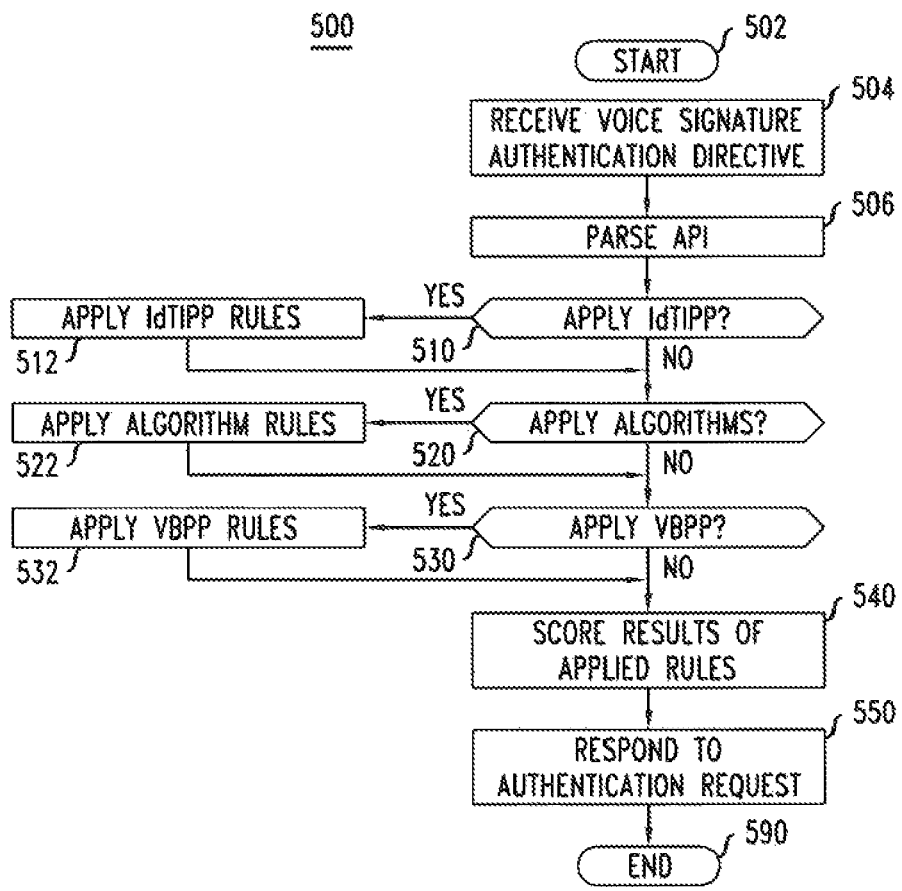
FIG. 5 depicts one embodiment of a method for providing a voice signature authentication.

FIG. 5 depicts one embodiment of a method for providing a voice signature authentication of a challenged voice signature in the voice signature system of FIG. 2.

In one embodiment, a challenged voice signature may be received by VSS 110 over a challenge voice interface. The challenged voice signature may contain any suitable information, including information from the VBPP 310 and/or IdTIPP 320 planes, to represent an end user being authenticated. It may be appreciated that the challenge voice interface may be any suitable interface or combination of interfaces used to delivery such information including, for example: (1) from SPs 130 via AIC 135 (e.g., delivering identity information within the voice signature authentication directive); (2) from a local device (e.g., retrieving voice biometric information from a microphone local to the VSS 110 system such as during a POS transaction); (3) from CPs 120 via CIC 125 (e.g., establishing a communication session to retrieve voice biometric information); (4) from EUs 140 via UIC 145 (e.g., an end user initiating a mobile payment transaction via their communication device); and/or (5) from an application (e.g., an online transaction that provides a voice authentication application from your web browser).

It may be appreciated that a challenge voice interface need not be a separate interface or a single interface. For example, information constructing the challenged voice signature may be derived from both the received voice signature authentication directive as well as over an SPs 130 which had information constructing the challenged voice signature returned from an end user password/challenge response.

At step 502, method 500 begins. At step 504, SPI 230 receives a voice signature authentication directive from SPs 130 via AIC 135. At step 506, processor 210 in cooperation with memory 211 and VSDB 212 parses the received voice signature authentication directive to determine the authentication rules that will be performed by VSiRS 260, including a determination of the end user who is being authenticated.

At steps 510 and 512, processor 210 in cooperation with memory 211 and VSDB 212 determines whether any authentication rules require VBPP 310 information within VSDB 212 and if so, cooperates with VSiRS 260 to execute the identified authentication rules.

At steps 520 and 522, processor 210 in cooperation with memory 211 and VSDB 212 determines whether any authentication rules require applying an algorithm rule and if so, processor 210 cooperates with VSiRS 260 to perform such identified algorithm rules. Algorithm rules may require IdTIPP 320 information or VBPP 310 information within VSDB 212.

At steps 530 and 532, processor 210 in cooperation with memory 211 and VSDB 212 determines whether any authentication rules require VBPP 310 information within VSDB 212 and if so; cooperates with VSiRS 260 to execute the identified authentication rules.

In one embodiment, step 530 may receive information regarding the quality of the voice channel to determine whether a usable voice biometric may be determined for comparison and bypass step 532 if the quality of the voice channel is not high enough to receive a reliable voice biometric.

At step 540, processor 210 in cooperation with memory 211 and VSDB 212 analyzes the results of the rules applied in steps 512, 522, and 532.

In one embodiment, step 540 may be applied at the output of each of steps 512, 522 and 532 and provide input into each subsequent step. For example, if step 540 is performed after step 512 and determines that there is a high confidence level in authentication of the user, input may be made into step 530 to bypass step 532 (e.g., only perform voice biometrics on a user authentication with a weaker confidence level).

At step 550, processor 210 in cooperation with memory 211 prepares a response to the voice signature authentication directive received from SPs 130 via AIC 135 in step 504 and transmits that response back to SPs 130 via AIC 135. At step 590, method 500 ends.

In one embodiment, a communication session may be established via step 532 and the voice biometric information obtained used to create the challenged voice signature, which may then be compared against the voice biometric information from the retrieved meta voice signature. The degree of confidence in a match between the two voice biometric signatures may then input into step 550 to response to SPs 130 with a "challenge" response indicating that SPs 130 need to initiate a further action in order to authentication the transaction.

Although primarily depicted and described in a particular sequence, it may be appreciated that the steps shown in method 500 may be performed in any suitable sequence. For example, step 540 might be applied during and/or at the output of one or more of steps 512, 522, and 532. Additionally, steps 410/412; 420/422; and 430/432 may be performed in any sequence and may even be dynamically configured based on authentication rules received in the voice signature authentication directive.

Although primarily depicted and described with respect to components in FIG. 2, it may be appreciated that any suitable components may be used to perform the steps of method 500 whether or not they are depicted and described in FIG. 2.

Figure 6:
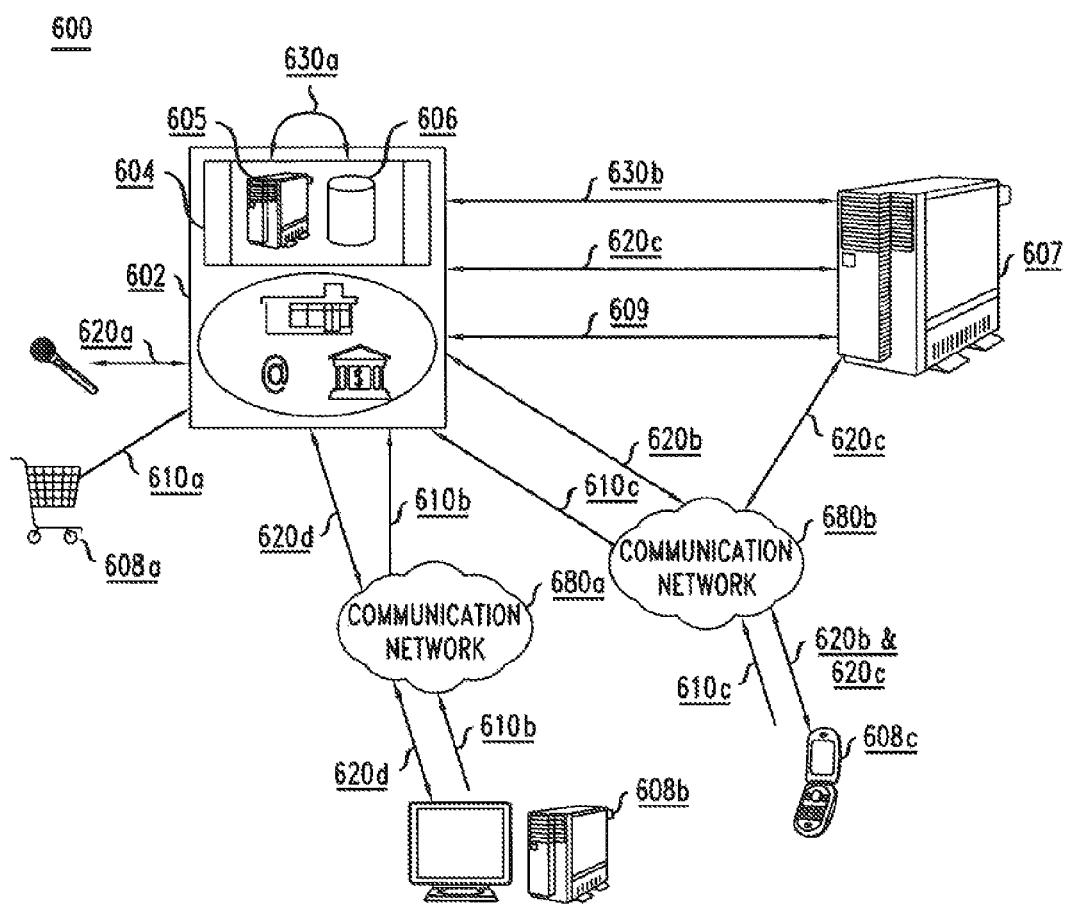
FIG. 6 depicts one embodiment of an exemplary voice signature system.

FIG. 6 depicts one embodiment of an exemplary voice signature system.

The voice signature system 600 includes a voice signature server (VSS) 607, a service provider 602 and an end user (illustratively, 608a, 608b and 608c).

Service provider 602 may include any service provider requesting voice signature authentication, such as internet service providers, stores, financial institutions, health care related service providers, enterprise applications, government agencies, and the like.

In one embodiment, service provider 602 may include a voice signature recognition server (VSiRS) 605 and additionally, service provider 602 may also include a voice signature database (VSDB) 606. Alternatively, service provider 602 may interface with VSS 607 to perform voice recognition functions and to store meta voice signatures. It may be appreciated that VSDB 606 may be a slave database to a central voice signature database and updated by the central voice signature server for example: upon changes in common data, at pre-determined periods or on demand. Moreover, it may be appreciated that if service provider 602 includes only VSiRS 605 and does not include VSDB 606, service provider 602 may obtain voice signature information to be used by VSiRS 605 from VSS 607 via application interface channel 609.

In one embodiment, service provider 602 provides voice signature authentication by: (1) receiving an end user request for a service; (2) upon determination that an end user meta voice signature is required, initiating communication with the end user; (3) comparing the obtained meta voice signature with the end user's stored meta voice signature; and (4) providing an authentication response (e.g., deny the service or allow the service). The voice signature system 600 includes a voice signature server (VSS) 607, a service provider 602 and an end user (illustratively, 608a, 608b and 608c).

It may be appreciated that an end user may initiate a request in any suitable way supported by service provider 602. For example: (1) end user 608a may be at a store, restaurant, kiosk, vending machine, using a mobile wallet or the like; (2) end user 608b may be online shopping, accessing healthcare, insurance or bank services, accessing enterprise applications (e.g., authenticating storage or accessing work services) or the like; or (3) end user 608c may be accessing healthcare, insurance or bank services, authenticating a caller for purposes of a telephonic interview, authenticating a telephonic sale, using a smart phone to access online services, or the like.

In one embodiment, end user requests (illustratively, 610a, 610b and 610c) for a service are received by service provider 602. It may be appreciated that the request may be in any suitable form supported by service provider 602.

In one embodiment, service provider 602 may use VSDB 606 for information relating to the end user and use VSiRS 605 to parse the returned database results to determine whether a voice authentication needs to be performed. It may be appreciated that if service provider 602 includes VSiRS 605 but not VSDB 606, service provider 602 may query VSS 607 via application interface channel 609 to receive the voice signature authentication directive to be parsed. It may be appreciated that querying a local VSDB for information required to form a voice signature authentication directive and receiving a voice signature authentication directive via an application interface channel are equivalent forms of receiving a voice signature authentication directive.

In one embodiment, upon determination that a voice authentication needs to be performed, service provider 602 initiates retrieval of meta voice signature information required (illustratively, 620a, 620b, 620c and 620d) to perform a voice analysis. It may be appreciated that the retrieval may be in any suitable form supported by service provider 602. For example: (1) as depicted by 620a, service provider 602 may provide a local method of retrieval; (2) as depicted by 620b, service provider 602 may perform retrieval by initiating a communication session over communication network 680b; (3) as depicted by 620c, service provider 602 may perform retrieval via the capabilities of VSS 607; or (4) as depicted by 620d, service provider 602 may perform retrieval by initiating a communication session over communication network 680a.

In one embodiment, service provider 602 utilizes VSiRS 605, as depicted by 630a, to implement the rules of the received voice signature authentication directive, score the results, and provide a voice signature authentication response. It may be appreciated that if service provider 602 does not include VSiRS 605, service provider 602 may use application interface channel 609 to retrieve the voice signature authentication response from VSS 607, which would implement the rules of the received voice signature authentication directive, score the results, and provide a voice signature authentication response back to service provider 602.

It may be appreciated that a voice signature authentication response may be any suitable action(s) by service provider 602 in response to the end user request for a service. For example, the voice signature authentication response may provide one or more of the following: providing an indication to authorize the service request; providing an indication to decline the service request; providing an indication to challenge the service request; providing a authentication score; providing meta voice signature data or the like.

It may be appreciated that communication networks 680a and 680b may be any suitable network (e.g., cellular telephony network, landline telephony network, packet network, or the internet) for facilitating communication from any suitable communication device (e.g., mobile phone, mobile payment device, landline phone, computer, tablet, VoIP phone, home payment device, gaming device or e-reader) to service provider 602.

It is contemplated that some of the steps discussed herein as software methods may be implemented within hardware, for example, as circuitry that cooperates with the processor to perform various method steps. Portions of the functions/elements described herein may be implemented as a computer program product (e.g., VSS 110 software may be created that is capable of cooperating with hardware to perform the functions as discussed herein), wherein computer instructions, when processed by a computer, adapt the operation of the computer such that the methods and/or techniques described herein are invoked or otherwise provided. Instructions for invoking the inventive methods or control of hardware/software components may be stored in fixed or removable media, transmitted via a data stream in a broadcast or other signal bearing medium, and/or stored within a memory within a computing device operating according to the instructions.

Although various embodiments which incorporate the teachings of the present invention have been described and depicted herein as incorporating voice biometrics, any suitable biometric information may be used (e.g., fingerprint biometrics or iris biometrics). Thus, the voice biometric processing plane may be more generally referred to as a biometric processing plane, the meta voice signature may be more generally referred to as a meta biometric signature, the voice signature authentication directive may be more generally referred to as a biometric signature authentication directive, the voice signature database may be more generally referred to as a biometric signature database, the challenge voice interface may be more generally referred to as a challenge biometric interface and the challenged voice signature may be more generally referred to as a challenged biometric signature.

Although various embodiments which incorporate the teachings of the present invention have been shown and described in detail herein, those skilled in the art can readily devise many other varied embodiments that still incorporate these teachings.

What is claimed is:

1. A voice signature authenticator for authenticating a voice signature of a user, comprising:
   one or more communication provider interfaces configured to receive communication content from a plurality of communication providers, wherein the communication providers are voice service providers and the communication content is associated with one or more voice calls;
   a voice signature database;
   a processor configured to:
   update the voice signature database based on the communication content; and
      retrieve a first voice channel characteristic associated with a communication session associated with the user;
      generate a meta voice signature based on the voice signature database and the first voice channel characteristic;
   a service provider interface configured to receive a voice signature authentication directive related to the communication content stored in the voice signature database; and
   a voice signature recognition server configured to parse the voice signature authentication directive;
   wherein the voice signature database comprises a voice biometric processing plane and an identity tracking intelligence processing plane; the voice biometric processing plane comprising information associated with voice biometric information and the identity tracking intelligence processing plane comprising information associated with user or network information;

wherein at least a portion of the information associated with user or network information is partitioned in the voice signature database based on a plurality of access levels;

wherein the meta voice signature is based on information from both the voice biometric processing plane and the identity tracking intelligence processing plane;

wherein the meta voice signature is configured to authenticate the voice signature using information from both the voice biometric processing plane and the identity tracking intelligence processing plane;

wherein the communication content comprises at least one of: voice biometric information; digital or analog voice samples; and voice channel properties; and wherein the voice signature recognition server applies one or more authentication rules based on the parsed voice signature authentication directive and one or more service provider authentication requirements, the one or more authentication rules comprising one or more biometric processing plane items or one or more identity tracking intelligence processing plane items.

2. The voice signature authenticator of claim 1, wherein the voice signature authentication directive comprises one or more algorithms;

wherein at least one of the one or more algorithms specify an operation associated with data in the voice signature database.

3. The voice signature authenticator of claim 2, wherein the one or more algorithms comprise comparing whether an end user is a member of an authorized group.

4. The voice signature authenticator of claim 2, further comprising a voice signature recognition server configured to parse the voice signature authentication directive.

5. The voice signature authenticator of claim 4, wherein the voice signature recognition server applies one or more authentication rules based on the parsed voice signature authentication directive, the one or more authentication rules comprising one or more biometric processing plane items and one or more identity tracking intelligence processing plane items.

6. The voice signature authenticator of claim 5, wherein the one or more authentication rules comprises initiating a voice analysis communication session.

7. The voice signature authenticator of claim 6, wherein the end user request comprises at least one of:
monitoring one more items in the voice signature database;
managing one more items in the voice signature database;
managing one more end user configuration items;
opting in/out of retrieval of communication content;
creating one or more automated notifications;
deleting an end user record;
activating/de-activating the automatic retrieval of communication content; and
activating/de-activating voice signature authentication.

8. The voice signature authenticator of claim 2, wherein the operation is a request for a location associated with a communication device associated with the user.

9. The voice signature authenticator of claim 1, further comprising an end user interface configured to receive an end user request related to the voice signature authentication database.

10. The apparatus of claim 1, wherein the communication content comprises a second voice channel characteristic regarding the channel condition associated with the communication content; and wherein updating the voice signature database is further based on the second voice channel characteristic.

11. The apparatus of claim 1, wherein the processor is further configured to:
retrieve call usage information associated with the user;
wherein generating a meta voice signature is further based on the call usage information.

12. A biometric signature authenticator, comprising:
a service provider interface configured to receive a biometric signature directive and retrieve a first channel characteristic associated with a communication session associated with the received biometric signature directive;
a biometric signature database comprising a biometric processing plane and an identity tracking intelligence processing plane; the biometric signature database configured to retrieve a meta biometric signature based on the biometric signature directive, the biometric processing plane and the identity tracking intelligence plane, wherein the biometric processing plane comprises information associated with biometric information and the identity tracking intelligence processing plane comprises information associated with user or network information;
a challenge biometric interface configured for receiving a challenged biometric signature; and
a voice signature recognition server configured to compare the challenged biometric with the meta biometric signature;
wherein at least a portion of the information associated with user or network information is partitioned in the biometric signature database based on a plurality of access levels; and
wherein the comparison between the challenged biometric and the meta biometric signature is based on the first voice channel characteristic, one or more service provider authentication requirements; and information from both the biometric processing plane and the identity tracking intelligence processing plane.

13. The biometric signature authenticator of claim 12, wherein the biometric signature database is adapted to enable associating both a first meta biometric signature and a second meta biometric signature with the same end user.

14. The biometric signature authenticator of claim 13, wherein the first meta biometric signature contains at least one type of information different than the second meta biometric signature.

15. The biometric signature authenticator of claim 13, wherein the first meta biometric signature contains communication provider information not contained in the second meta biometric signature.

16. A method of authenticating a biometric signature using a biometric signature authenticator, including: one or more communication provider interfaces configured to receive communication content from a plurality of communication providers; and a biometric signature database configured to store the communication content, the method comprising the steps of:
at a processor communicatively connected to a memory, receiving a biometric signature authentication directive;
retrieving, by the processor in cooperation with the memory, a first channel characteristic associated with a communication session associated with the biometric signature authentication directive;

parsing, by the processor in cooperation with the memory, the biometric signature authentication directive;

determining, by the processor in cooperation with the memory, an access level;

applying, by the processor in cooperation with the memory, a plurality of authentication rules based on one or more service provider authentication requirements and the access level, the plurality of authentication rules including at least one authentication rule associated with a biometric processing plane and at least one authentication rule associated with an identity tracking intelligence processing plane; wherein the biometric processing plane comprises information associated with biometric information and the identity tracking intelligence processing plane comprises information associated with user or network information; and wherein at least one of the plurality of authentication rules is based on the first channel characteristic;

scoring, by the processor in cooperation with the memory, the results of the applied authentication rules; and providing, by the processor in cooperation with the memory, a biometric signature authentication response based on the scoring of the applied authentication rules, the biometric signature authentication response being configured to authenticate the biometric signature based on information from both the biometric processing plane and the identity tracking intelligence processing plane;

wherein at least a portion of the information associated with user or network information is partitioned in the biometric signature database based on the access level.

17. The method of claim 16, wherein the one or more authentication rules comprise one or more biometric processing plane items and one or more identity tracking intelligence processing plane items.

18. The method of claim 17, wherein the step of applying comprises automatically establishing a voice analysis communication session with a communication device.

19. The method of claim 18, wherein the biometric signature authentication directive comprises one or more algorithms.

20. The method of claim 19, wherein the one or more algorithms comprise requesting, by the processor in cooperation with the memory, a fraud score from an external source.

* * * * *